*T. Leeson.*

*Earth Auger.*

N°. 66,400. Patented Jun. 4, 1867.

Witnesses:
Thos Trische
J A Service

Inventor:
Thos Leeson
Per
Munn & Co
Attorneys

United States Patent Office.

THOMAS LEESON, OF SHARON, WISCONSIN.

*Letters Patent No. 65,400, dated June 4, 1867.*

POST-HOLE AUGER.

*The Schedule referred to in these Letters Patent and making part of the same.*

TO ALL WHOM IT MAY CONCERN:

Be it known that I, THOMAS LEESON, of Sharon, in the county of Walworth, and State of Wisconsin, have invented a new and useful improvement in Post Auger; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
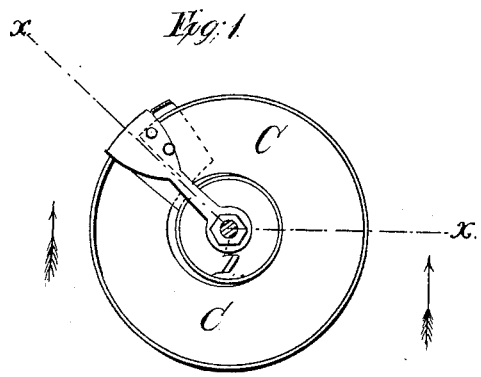
Figure 1 is a top view of my improved auger, the shank being cut off through the line $y\ y$, fig. 2.
Figure 2:
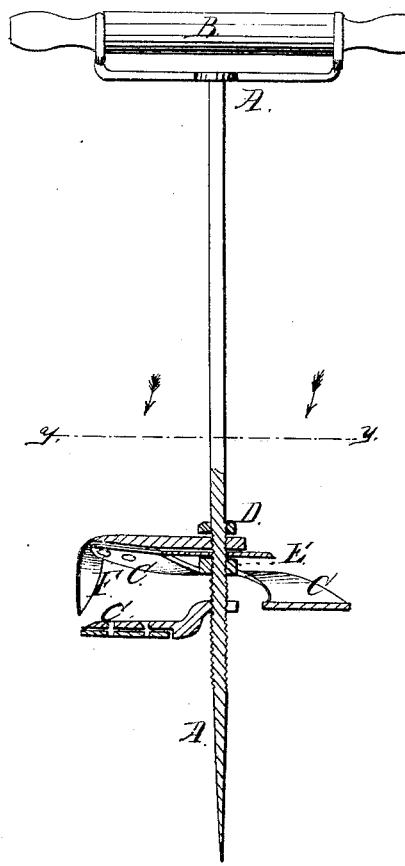
Figure 2 is a side view of the same, partly in section, through the line $x\ x$, fig. 1.

My invention has for its object to furnish an improved auger for boring post holes, simple in construction and effective in operation; and it consists in the combination of the spiral spring-plate and adjusting-nuts with each other and with the shank of the auger, as hereinafter more fully described.

A is the shank, the upper end of which is made branched for the more convenient attachment of the handle B. The lower end of the shank A is made pointed, to more easily enter the ground, and to steady the auger while boring its way into the ground. C is the spring-plate, which is made of such a length as to pass a little more than once around the shank. The shank A passes through holes in the ends of the plate, or in arms formed upon or attached to said plate. The hole in the lower end of said spring-plate has a screw-thread cut in it fitting upon a screw-thread cut upon the lower part of the shank A; the hole through the upper end is of such a size that it can move freely up and down over the screw-threads upon the shank A. D and E are nuts fitting upon the screw-thread of the shank A, and which are placed the one above and the other below the said plate so as to clamp the upper end of said plate securely in any desired position. This construction enables the ends of the plate C to be set and secured at any desired distance apart, and enables the feed of the saw to be adjusted at pleasure according to the character of the ground in which the hole is being bored. F is a lip formed upon or attached to the outer edge of the upper part of the plate C, and extending down nearly to the other end of the said plate to separate the ground loosened by the advance of the forward end of the plate so as to leave a smooth interior surface to said hole.

I claim as new, and desire to secure by Letters Patent—

The combination of the spiral spring-plate C and nuts D and E with each other and with the shank A, substantially as herein shown and described and for the purpose set forth.

THOMAS LEESON.

Witnesses:
F. P. ARNOLD,
J. A. TREAT.